United States Patent
Iranitalab et al.

(10) Patent No.: US 12,323,424 B2
(45) Date of Patent: Jun. 3, 2025

(54) SYSTEMS AND METHODS FOR DETERMINING TRUSTED DEVICES

(71) Applicant: Capital One Services, LLC, McLean, VA (US)

(72) Inventors: Amirfarrokh Iranitalab, Lincoln, NE (US); Salman Haq, Herndon, VA (US); Sriharsha Kallu, Glen Allen, VA (US); Vitalie Manzul, McLean, VA (US); Philip Spiegel, Midlothian, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 205 days.

(21) Appl. No.: 17/945,961

(22) Filed: Sep. 15, 2022

(65) Prior Publication Data

US 2024/0098086 A1  Mar. 21, 2024

(51) Int. Cl.
*H04L 9/40* (2022.01)
*H04L 41/16* (2022.01)

(52) U.S. Cl.
CPC .......... *H04L 63/0876* (2013.01); *H04L 41/16* (2013.01); *H04L 63/105* (2013.01)

(58) Field of Classification Search
CPC ............. H04L 63/1425; H04L 63/0227; H04L 63/145; H04L 63/0245; H04L 67/535; H04L 63/168; G06F 21/6218; G06F 9/46; G06F 2221/2141
USPC .......................................................... 726/4
See application file for complete search history.

(56) References Cited

U.S. PATENT DOCUMENTS

| | | | |
|---|---|---|---|
| 9,083,750 B2* | 7/2015 | Gomez | H04L 63/20 |
| 10,147,065 B1* | 12/2018 | Yiftachel | G06F 21/45 |
| 10,541,993 B2 | 1/2020 | Johansson et al. | |
| 10,867,303 B1* | 12/2020 | Manapat | G06Q 10/067 |
| 11,178,068 B1* | 11/2021 | Etler | H04L 47/826 |
| 11,429,977 B2* | 8/2022 | Elfeky | G06Q 20/405 |
| 11,620,652 B1* | 4/2023 | Manapat | G06Q 20/4016 |
| | | | 705/44 |
| 11,941,129 B2* | 3/2024 | Broome | G06F 21/629 |
| 2011/0191138 A1* | 8/2011 | Saraf | G06Q 10/0635 |
| | | | 706/54 |
| 2019/0295086 A1* | 9/2019 | Ashiya | G06Q 20/4016 |

(Continued)

FOREIGN PATENT DOCUMENTS

WO  2021183040 A1  9/2021

*Primary Examiner* — Sargon N Nano
(74) *Attorney, Agent, or Firm* — TROUTMAN PEPPER LOCKE LLP; Christopher J. Forstner; John A. Morrissett (57) ABSTRACT

Disclosed embodiments may include a system for determining trusted devices. The system may receive data corresponding to a plurality of users. The system may receive, via a plurality of user devices associated with the plurality of users, a respective request to conduct a plurality of transactions. The system may generate, via an MLM and based on the data, trust scores associated with the plurality of users and the plurality of user devices, wherein each trust score indicates a probability that a user device, of the plurality of user devices, is associated with a user of the plurality of users. The system may determine whether each trust score of a plurality of trust scores exceeds a predetermined threshold. Responsive to determining a trust score of the plurality of trust scores exceeds the predetermined threshold, the system may conduct fraud prevention action(s) with respect to a corresponding user device and user.

18 Claims, 4 Drawing Sheets

(56) References Cited

U.S. PATENT DOCUMENTS

| | | |
|---|---|---|
| 2019/0392441 A1* | 12/2019 | Lee .................. G06N 20/00 |
| 2020/0137097 A1* | 4/2020 | Zimmermann ..... H04L 63/1425 |
| 2021/0065192 A1* | 3/2021 | Kang ............... G06Q 20/4016 |
| 2021/0173906 A1 | 6/2021 | Keith, Jr. et al. |
| 2021/0201322 A1* | 7/2021 | John .................. G06F 21/35 |
| 2022/0101192 A1* | 3/2022 | Patel .................. G06N 7/01 |
| 2022/0122091 A1* | 4/2022 | An .................... G06Q 20/407 |
| 2022/0180368 A1* | 6/2022 | Immaneni .......... G06Q 20/4014 |
| 2022/0245643 A1* | 8/2022 | Venkatasubramaniam ............ G06N 3/08 |
| 2022/0318394 A1* | 10/2022 | Broome ............. G06F 21/57 |
| 2022/0358509 A1* | 11/2022 | Martin ............... G06Q 30/018 |
| 2023/0237493 A1* | 7/2023 | Gu .................... G06Q 40/02 705/44 |
| 2023/0385844 A1* | 11/2023 | Laptiev ............. G06Q 20/407 |
| 2024/0028975 A1* | 1/2024 | Kan .................. G06F 18/22 |
| 2024/0095742 A1* | 3/2024 | Chen ................ G06N 20/00 |

\* cited by examiner

SYSTEMS AND METHODS FOR DETERMINING TRUSTED DEVICES

The disclosed technology relates to systems and methods for determining trusted devices. Specifically, this disclosed technology relates to determining trust scores associated with user-device pairs.

BACKGROUND

With the increasing prevalence of online transactions, traditional systems seek to authenticate individuals prior to allowing them to conduct higher risk transactions, such as those involving higher amounts of money or those that may pose greater risk to a responsible party (e.g., an entity or organization). When conducting these types of online transactions, individuals are often requested to provide one or more forms of authentication, such as a password, biometric information, a response to a security question, etc., such that the responsible party can be confident in the individual's identity.

Accordingly, there is a need for improved systems and methods for determining trusted devices. Embodiments of the present disclosure may be directed to this and other considerations.

SUMMARY

Disclosed embodiments may include a system for determining trusted devices. The system may include one or more processors, and memory in communication with the one or more processors and storing instructions that, when executed by the one or more processors, are configured to cause the system to share data. The system may receive data corresponding to a plurality of users. The system may receive, via a plurality of user devices associated with the plurality of users, a respective request to conduct a plurality of transactions. The system may generate, via a machine learning model (MLM) and based on the data, trust scores associated with the plurality of users and the plurality of user devices, wherein each trust score indicates a probability that a user device, of the plurality of user devices, is associated with a user of the plurality of users. The system may determine whether each trust score of a plurality of trust scores exceeds a predetermined threshold. Responsive to determining a trust score of the plurality of trust scores exceeds the predetermined threshold, the system may conduct one or more fraud prevention actions with respect to a corresponding user device and user, wherein a rate of conducting the one or more fraud prevention actions for the plurality of users is 30 percent or less.

Disclosed embodiments may include a system for determining trusted devices. The system may include one or more processors, and memory in communication with the one or more processors and storing instructions that, when executed by the one or more processors, are configured to cause the system to share data. The system may receive data corresponding to a user. The system may receive, via a user device, a request for authentication. The system may determine that the request does not satisfy one or more static rules. Responsive to determining the request does not satisfy the one or more static rules, the system may generate, via an MLM and based on the data, a trust score associated with the user and the user device, wherein the trust score indicates a probability that the user device is associated with the user. The system may determine whether the trust score exceeds a predetermined threshold. Responsive to determining the trust score exceeds the predetermined threshold, the system may conduct one or more fraud prevention actions.

Disclosed embodiments may include a method for determining trusted devices. The method may include receiving data corresponding to a user. The method may include receiving, via a user device, a request to conduct a transaction. The method may include generating, via an MLM and based on the data, a trust score associated with the user and the user device, wherein the trust score indicates a probability that the user device is associated with the user. The method may include determining whether the trust score exceeds a predetermined threshold. Responsive to determining the trust score exceeds the predetermined threshold, the method may include conducting one or more fraud prevention actions.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Systems and methods for determining trusted devices may rely on static rules to conduct user-device pair authentication. For example, when a device fails a static rule, the system may require additional steps to authenticate the user on the device. These static rules, such as whether the user has passed an authentication challenge on the device in the past 30 days, are typically applied across all user-device pairs, resulting in high rates of requiring additional authentication steps on the user device to authenticate a given session, which can be burdensome on users. As such, responsible application providers can find their interaction or application usage rates reduced based on users abandoning certain application interactions when feeling overly burdened with authentication challenges.

Accordingly, examples of the present disclosure may provide for receiving an authentication and/or authorization request from a user via a user device, generating a trust score based on predicting fraud, associated with the user and user device (the user-device pair), determining whether the trust score exceeds a predetermined threshold, and conducting fraud prevention action(s) based on such determination.

Disclosed embodiments may employ machine learning models (MLMs), among other computerized techniques, to determine a trust score associated with each user-device pair authentication attempt (e.g., when attempting a transaction).

Machine learning models are a unique computer technology that involves training models to complete tasks and make decisions. These techniques may help to improve database and network operations. For example, the systems and methods described herein may utilize, in some instances, MLMs, which are necessarily rooted in computers and technology, to determine a fraud prediction-based trust score associated with a user-device pair to then determine whether conducting fraud prevention action(s) with respect to the specific user-device pair is necessary. This, in some examples, may involve using user-, device-, and/or user-device-specific input data and an MLM, applied to determine a user-device pair trust score. Using an MLM and a computer system configured in this way may allow the system to maintain an acceptable fraud rate, while reducing an overall user challenge rate.

This may provide an advantage and improvement over prior technologies that require the same user-device authentication across all user-device pairs based on a set of static rules. The present disclosure solves this problem by taking a customized approach to user-device authentication such that any required authentication may be intelligently based on a specific user-device pair. Furthermore, examples of the present disclosure may also improve the speed with which computers can determine trusted user-device pairs. Overall, the systems and methods disclosed have significant practical applications in the authentication and fraud prevention fields because of the noteworthy improvements of the customization of authentication challenges, which are important to solving present problems with this technology.

Disclosed embodiments may advantageously work in conjunction with static rules. For example, disclosed MLM processing may be employed when certain static rule outcomes (and/or combinations and permutations of static rule outcomes) occur. Disclosed embodiments may combine static rules with MLM processing to make efficient use of MLM resources by leveraging MLM techniques in situations where they have been discovered to provide greater value. For example, one advantageous aspect of certain embodiments may include the particular situation in which MLM processing is employed.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
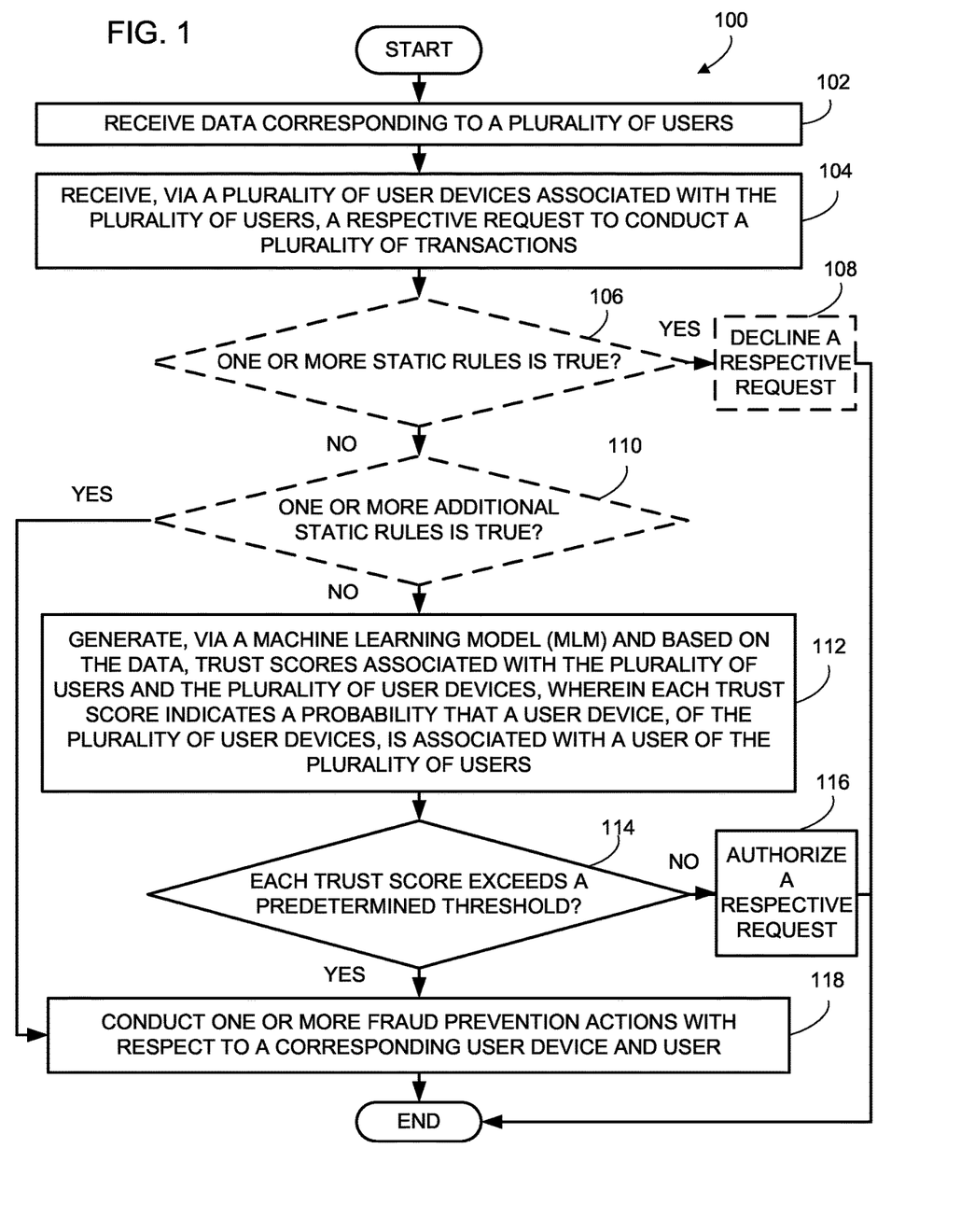
FIG. 1 is a flow diagram illustrating an exemplary method for determining trusted devices in accordance with certain embodiments of the disclosed technology.

FIG. 1 is a flow diagram illustrating an exemplary method 100 for determining trusted devices, in accordance with certain embodiments of the disclosed technology. The steps of method 100 may be performed by one or more components of the system 400 (e.g., trust score generation system 320 or web server 410 of fraud prevention system 408, or user device 402), as described in more detail with respect to FIGS. 3 and 4. While certain blocks may be identified as being optional, certain embodiments may omit blocks even if they are not necessarily identified as being optional.

In block 102, the trust score generation system 320 may receive data corresponding to a plurality of users. For example, a plurality of users may all be customers of the same organization (e.g., a financial institution), whereby the organization receives data associated with the users, such as account login credentials, associated user devices, personal information, financial information, and the like. In some embodiments, the system may be configured to continuously receive, update, and/or store the data corresponding to the plurality of users to aid in accurate model predictions, as further discussed below.

In block 104, the trust score generation system 320 may receive, via a plurality of user devices associated with the plurality of users, a respective request to conduct a plurality of transactions. In some embodiments, each (or one or more) of the plurality of users may request to conduct a transaction via a respective user device. For example, when each of the plurality of users is logged into a respective online account, each user may attempt to conduct a certain transaction, such as transferring of funds, accessing certain transaction data or information, etc. In some embodiments, each (or one or more) of the plurality of users may request to utilize an application, or engage in some form of interaction within an application or system. For example, each of the plurality of users may request to access an account (e.g., email), join a computer network, participate in a joint user session, etc. These transactions and/or interactions may be of a high risk type whereby the responsible party, e.g., an entity or organization that owns and/or operates fraud prevention system 408, may experience higher rates of fraud and thereby require enhanced authentication from users requesting to conduct such transactions or engage in such interactions.

In optional block 106, the trust score generation system 320 may determine whether one or more static rules is true for each request (e.g., to conduct a transaction and/or engage in an interaction) received (block 104). The one or more static rules may include, for example, whether a certain user failed an authentication request or process on a specific device in the last 30 days, whether a specific device is listed on a predetermined list of unauthorized devices, whether a recognized Internet Protocol (IP) address is unauthorized (e.g., based on a location of origin, a certain hosting provider, etc.), and the like. A benefit of initially determining whether one or more static rules is true for a requested transaction or interaction is that the system may be configured to determine at what certain stage of the overall authentication process might an MLM be effectively employed to customize the authentication process for a certain user-device pair, as further discussed herein. The system may also be configured to prevent certain higher-risk transactions or interactions from moving forward in the authentication process, such as those being initiated by or conducted on a device the system recognizes as having been used in the past for committing fraudulent transactions.

In optional block 108, responsive to determining the one or more static rules is true for a specific user-device pair, the trust score generation system 320 may decline the respective request associated with that user-device pair.

In optional block 110, responsive to determining the one or more static rules is not true for a specific user-device pair, the trust score generation system 320 may determine whether one or more additional static rules is true, for example, whether a specific device is less than a certain age (e.g., seven days old). In some embodiments, responsive to determining the one or more additional static rules is true, the trust score generation system 320 may conduct one or more fraud prevention actions with respect to the corresponding user-device pair, as further discussed below with respect to block 118. The one or more additional static rules may be configured to provide an additional layer of potential fraud prevention prior to the system customizing or enhancing the authentication process using an MLM, as further discussed herein.

In block 112, responsive to determining the one or more additional static rules are not true for specific user-device pairs, the trust score generation system 320 may generate, via an MLM and based on the data, fraud prediction-based trust scores associated with the plurality of users and the plurality of user devices, wherein each trust score indicates a probability that a user device, of the plurality of user devices, is associated with a user of the plurality of users. For example, for each attempted transaction or interaction, the MLM may be trained to evaluate the data associated with the specific user and user device (specific user-device pair) attempting the transaction or interaction, and/or the data associated with all other users and user devices of the plurality of users and plurality of user devices, to aid in predicting whether a specific user-device pair is a trusted pair. For example, the system may be configured to compare data across the plurality of users and plurality of user devices to make a prediction as to whether the specific user corresponds to (e.g., owns, typically operates, etc.) the specific user device. In some embodiments, the MLM may include a binary classifier to predict potential fraud (e.g., as an event) associated with a user-device pair, and to produce a probability that the user-device pair is fraudulent (e.g., the device does not belong to the user).

In some embodiments, the MLM may generate the trust scores based further on one or more respective user-device engagement features associated with the plurality of users and the plurality of user devices. The engagement features may include, for example, login frequency, challenge rate, abandonment rate, success rate, time since a previous activity, number of recent devices associated with a user, number of users associated with a user device, user device age, user device type, whether certain applications are installed on a device, types and/or methods of authentication, and the like. In some embodiments, the challenge rate may include a respective rate of conducting the one or more fraud prevention actions for each of the plurality of users, as further discussed below. In some embodiments, the abandonment rate may include a respective rate associated with each of the plurality of users abandoning a respective request to conduct one or more transactions and/or engage in one or more interactions. For example, the abandonment rate may indicate a rate or frequency by which users have initiated a transaction, yet abandoned the transaction before it was completed. In some embodiments, the success rate may include a respective rate associated with each of the plurality of users successfully completing one or more requested actions associated with the one or more fraud prevention actions, as further discussed below.

In block 114, the trust score generation system 320 may determine whether each trust score of a plurality of trust scores exceeds a predetermined threshold. In some embodiments, the predetermined threshold may be predefined, e.g., by the system, as corresponding to a fraud tolerance or a rate of fraud the system is willing or able to accept. For example, the system may be configured to accept no more than a 39 percent fraud recall rate across all transactions and/or interactions conducted, and hence the predetermined threshold for each trust score may be set to achieve that overall 39 percent fraud recall rate. In such example, should a trust score of the plurality of trust scores be found to exceed the predetermined threshold, resulting in the overall fraud recall rate increasing above 39 percent, the system may be configured to conduct one or more fraud prevention actions, as further discussed below.

In block 116, responsive to determining a trust score of the plurality of trust scores does not exceed the predetermined threshold, thereby providing an indication that the specific user-device pair may be trustworthy, the trust score generation system 320 may authorize a respective request (e.g., to access an account, conduct a transaction, etc.) associated with that user-device pair without requesting additional authentication information from the user-device pair.

In block 118, responsive to determining a trust score of the plurality of trust scores exceeds the predetermined threshold, the trust score generation system 320 may conduct one or more fraud prevention actions with respect to a corresponding user-device pair. In some embodiments, the one or more fraud prevention actions may include, for example, transmitting a notification to the corresponding user device, and/or requesting the corresponding user conduct multi-factor authentication. It will be appreciated that the one or more fraud prevention actions can include a variety of other actions requested of a user to increase system confidence that the user-device pair is trusted.

In some embodiments, a rate of conducting the one or more fraud prevention actions for the plurality of users, e.g., the challenge rate, may be, for example, 30 percent or less. In some embodiments, while the challenge rate may be 30 percent or less, an overall fraud recall rate may be, for example, approximately 39 percent. In comparison, some traditional systems and methods configured to provide an overall fraud recall rate of approximately 39 percent, provide a challenge rate of, for example, approximately 63 percent. As such, the systems and methods disclosed herein may provide a decrease in challenge rate of approximately 52 percent ((0.63−0.30)/0.63). A benefit of such decrease in challenge rate is that more users may be willing to complete transactions and/or interactions rather than abandoning them pre-completion due to a burden of authentication requests.

Figure 2:
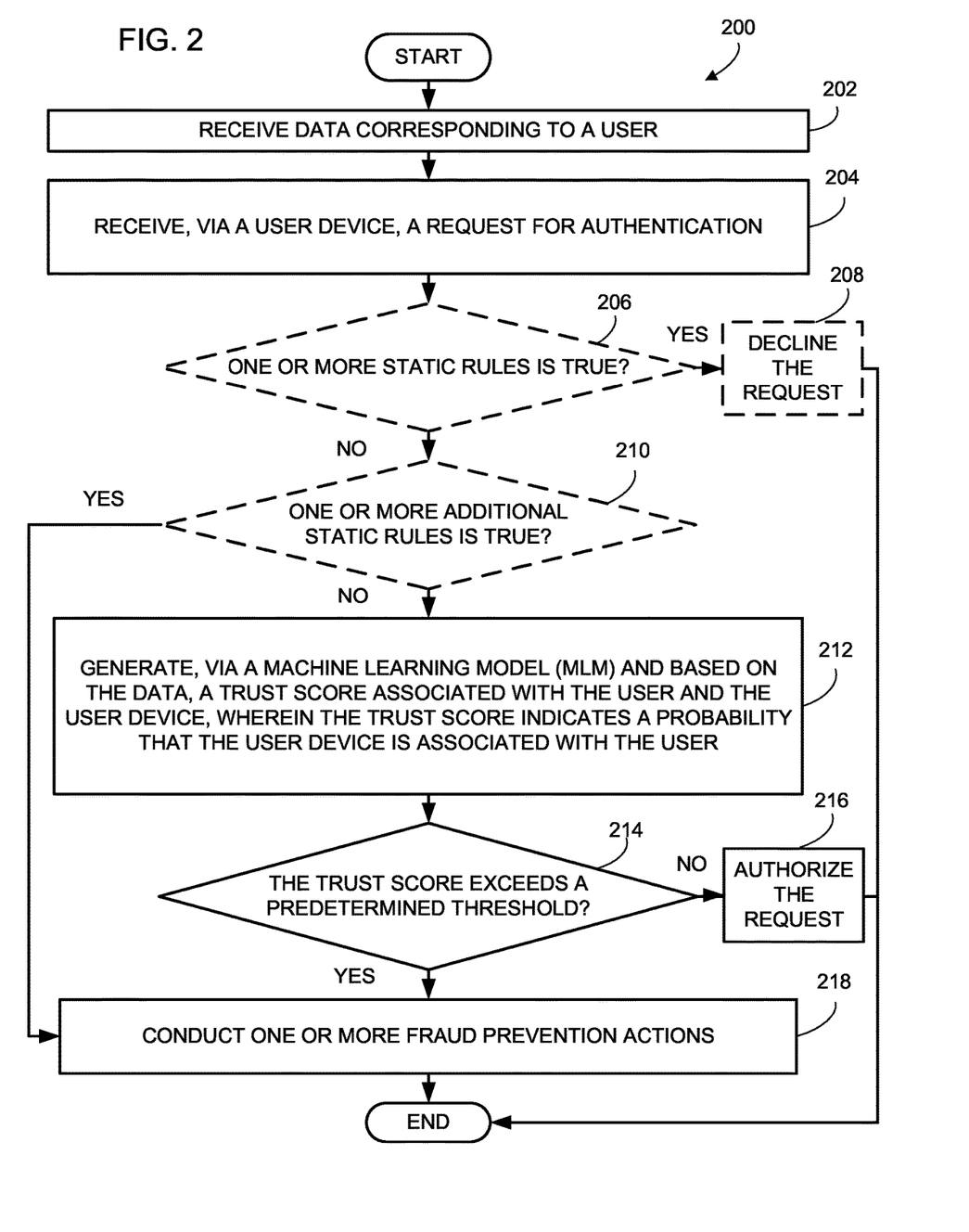
FIG. 2 is a flow diagram illustrating an exemplary method for determining trusted devices in accordance with certain embodiments of the disclosed technology.

FIG. 2 is a flow diagram illustrating an exemplary method 200 for determining trusted devices, in accordance with certain embodiments of the disclosed technology. The steps of method 200 may be performed by one or more components of the system 400 (e.g., trust score generation system 320 or web server 410 of fraud prevention system 408, or user device 402), as described in more detail with respect to FIGS. 3 and 4.

Method 200 of FIG. 2 may be the same as or similar to method 100 of FIG. 1, except that method 200 may be performed with respect to a single user-device pair rather than a plurality of user-device pairs. The respective descriptions of blocks 202, 204, 206, 208, 210, 212, 214, 216, and 218 of method 200 may be the same as or similar to the respective descriptions of blocks 102, 104, 106, 108, 110, 112, 114, 116, and 118 of method 100, except that blocks 202, 204, 206, 208, 210, 212, 214, 216, and 218 may refer to a single user-device pair, and as such, are not repeated herein for brevity.

Figure 3:
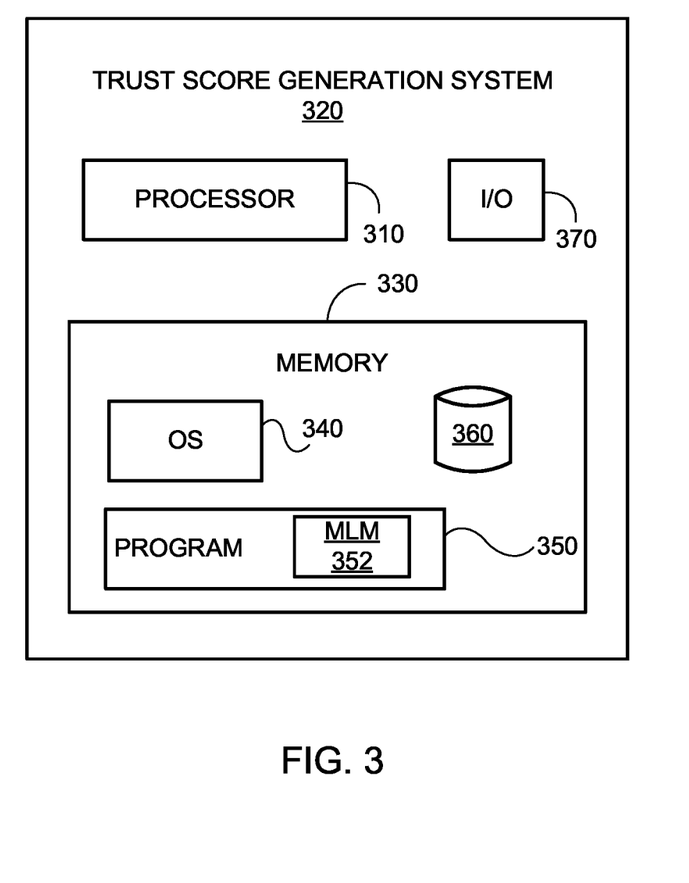
FIG. 3 is block diagram of an example trust score generation system used to determine trusted devices, according to an example implementation of the disclosed technology.
Figure 4:
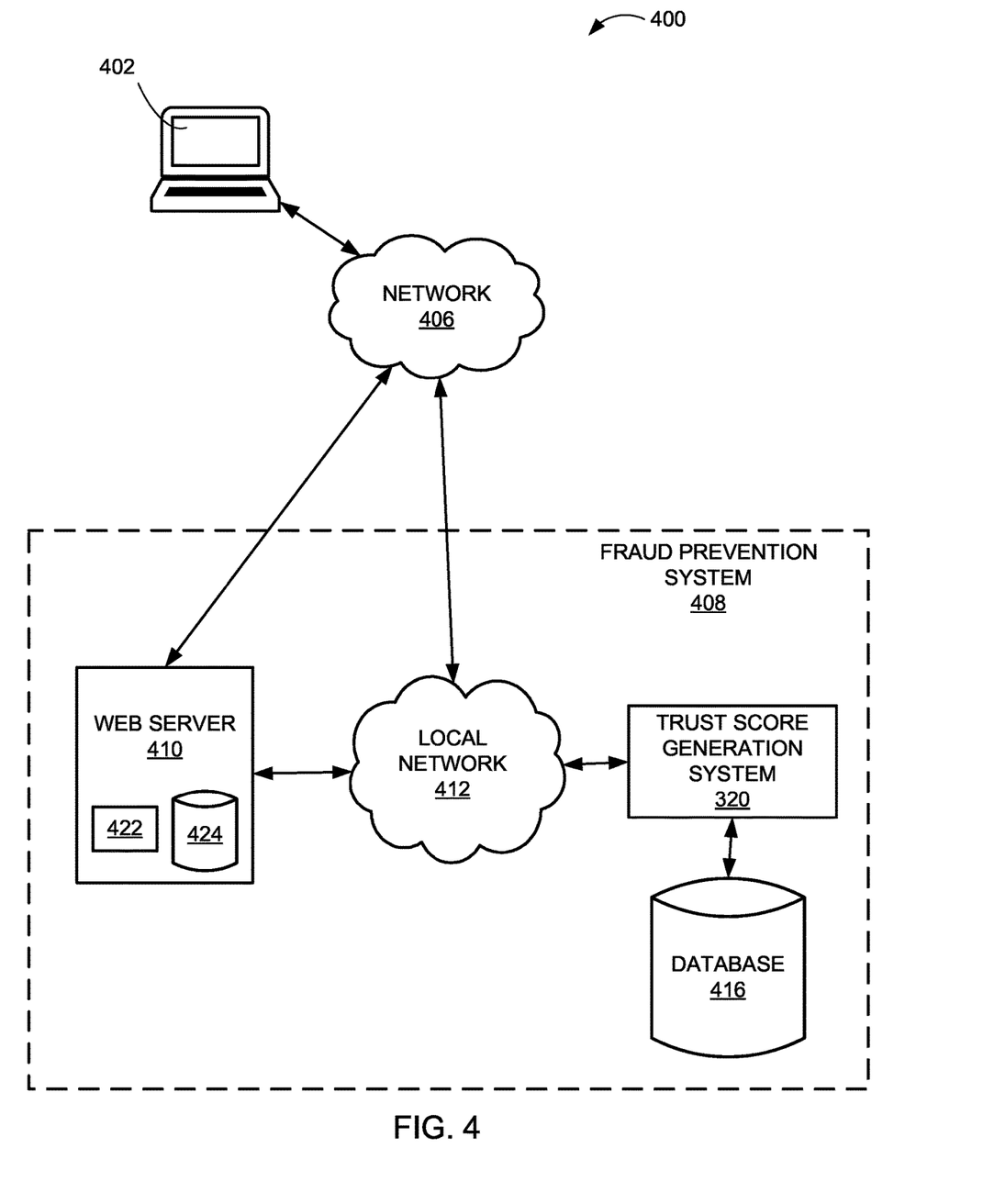
FIG. 4 is block diagram of an example system that may be used to determine trusted devices, according to an example implementation of the disclosed technology.

FIG. 3 is a block diagram of an example trust score generation system 320 used to share data according to an example implementation of the disclosed technology. According to some embodiments, the user device 402 and web server 410, as depicted in FIG. 4 and described below, may have a similar structure and components that are similar to those described with respect to trust score generation system 320 shown in FIG. 3. As shown, the trust score generation system 320 may include a processor 310, an input/output (I/O) device 370, a memory 330 containing an operating system (OS) 340 and a program 350. In some embodiments, program 350 may include an MLM 352 that may be trained, for example, to determine trust scores associated with user and user device pairs. In certain implementations, MLM 352 may issue commands in response to processing an event, in accordance with a model that may be continuously or intermittently updated. Moreover, processor 310 may execute one or more programs (such as via a rules-based platform or the trained MLM 352), that, when executed, perform functions related to disclosed embodiments.

In certain example implementations, the trust score generation system 320 may be a single server or may be configured as a distributed computer system including multiple servers or computers that interoperate to perform one or more of the processes and functionalities associated with the disclosed embodiments. In some embodiments trust score generation system 320 may be one or more servers from a serverless or scaling server system. In some embodiments, the trust score generation system 320 may further include a peripheral interface, a transceiver, a mobile network interface in communication with the processor 310, a bus configured to facilitate communication between the various components of the trust score generation system 320, and a power source configured to power one or more components of the trust score generation system 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), NFC, Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 310 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 310 may be a single core processor that is configured with virtual processing technologies. In certain embodiments, the processor 310 may use logical processors to simultaneously execute and control multiple processes. The processor 310 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the trust score generation system 320 may include one or more storage devices configured to store information used by the processor 310 (or other components) to perform certain functions related to the disclosed embodiments. In one example, the trust score generation system 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The trust score generation system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the trust score generation system 320 may include the memory 330 that may include one or more programs 350 to perform one or more functions of the disclosed embodiments. For example, in some embodiments, the trust score generation system 320 may additionally manage dialogue and/or other interactions with the customer via a program 350.

The processor 310 may execute one or more programs 350 located remotely from the trust score generation system 320. For example, the trust score generation system 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a fraud detection system database 360 for storing related data to enable the trust score generation system 320 to perform one or more of the processes and functionalities associated with the disclosed embodiments.

The user tracking system database 360 may include stored data relating to status data (e.g., average session duration data, location data, idle time between sessions, and/or average idle time between sessions) and historical status data. According to some embodiments, the functions provided by the user tracking system database 360 may also be provided by a database that is external to the trust score generation system 320, such as the database 416 as shown in FIG. 4.

The trust score generation system 320 may also be communicatively connected to one or more memory devices (e.g., databases) locally or through a network. The remote memory devices may be configured to store information and may be accessed and/or managed by the trust score generation system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The trust score generation system 320 may also include one or more I/O devices 370 that may comprise one or more interfaces for receiving signals or input from devices and providing signals or output to one or more devices that allow data to be received and/or transmitted by the trust score generation system 320. For example, the trust score generation system 320 may include interface components, which may provide interfaces to one or more input devices, such as one or more keyboards, mouse devices, touch screens, track pads, trackballs, scroll wheels, digital cameras, microphones, sensors, and the like, that enable the trust score generation system 320 to receive data from a user (such as, for example, via the user device 402).

In examples of the disclosed technology, the trust score generation system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The trust score generation system 320 may contain programs that train, implement, store, receive, retrieve, and/or transmit one or more MLMs. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The trust score generation system 320 may be configured to adjust model parameters during training. Model parameters may include weights, coefficients, offsets, or the like. Training may be supervised or unsupervised.

The trust score generation system 320 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The trust score generation system 320 may be configured to optimize statistical models using known optimization techniques.

Furthermore, the trust score generation system 320 may include programs configured to retrieve, store, and/or analyze properties of data models and datasets. For example, trust score generation system 320 may include or be configured to implement one or more data-profiling models. A data-profiling model may include machine learning models and statistical models to determine the data schema and/or a statistical profile of a dataset (e.g., to profile a dataset), consistent with disclosed embodiments. A data-profiling model may include an RNN model, a CNN model, or other machine-learning model.

The trust score generation system 320 may include algorithms to determine a data type, key-value pairs, row-column data structure, statistical distributions of information such as keys or values, or other property of a data schema may be configured to return a statistical profile of a dataset (e.g., using a data-profiling model). The trust score generation system 320 may be configured to implement univariate and multivariate statistical methods. The trust score generation system 320 may include a regression model, a Bayesian model, a statistical model, a linear discriminant analysis model, or other classification model configured to determine one or more descriptive metrics of a dataset. For example, trust score generation system 320 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The trust score generation system 320 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, trust score generation system 320 may be configured to generate a similarity metric representing a measure of similarity between data in a dataset. A similarity metric may be based on a correlation, covariance matrix, a variance, a frequency of overlapping values, or other measure of statistical similarity.

The trust score generation system 320 may be configured to generate a similarity metric based on data model output, including data model output representing a property of the data model. For example, trust score generation system 320 may be configured to generate a similarity metric based on activation function values, embedding layer structure and/or outputs, convolution results, entropy, loss functions, model training data, or other data model output). For example, a synthetic data model may produce first data model output based on a first dataset and a produce data model output based on a second dataset, and a similarity metric may be based on a measure of similarity between the first data model output and the second-data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The trust score generation system 320 may be configured to classify a dataset. Classifying a dataset may include determining whether a dataset is related to another datasets. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may indicate a similarity between datasets and/or a hierarchical relationship (e.g., a data lineage, a parent-child relationship). In some embodiments, classifying a dataset may include generating graphical data, such as anode diagram, a tree diagram, or a vector diagram of datasets. Classifying a dataset may include estimating a likelihood that a dataset relates to another dataset, the likelihood being based on the similarity metric.

The trust score generation system 320 may include one or more data classification models to classify datasets based on the data schema, statistical profile, and/or edges. A data classification model may include a convolutional neural network, a random forest model, a recurrent neural network model, a support vector machine model, or another machine learning model. A data classification model may be configured to classify data elements as actual data, synthetic data, related data, or any other data category. In some embodiments, trust score generation system 320 is configured to generate and/or train a classification model to classify a dataset, consistent with disclosed embodiments.

The trust score generation system 320 may also contain one or more prediction models. Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models.

In some examples, prediction models may cluster points of data in functional groups such as "random forests." Random Forests may comprise combinations of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via a weighted connections. Prediction models may additionally or alternatively include classification and regression trees, or other types of models known to those skilled in the art. To generate prediction models, the asset detection system may analyze information applying machine-learning methods.

While the trust score generation system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the trust score generation system 320 may include a greater or lesser number of components than those illustrated.

FIG. 4 is a block diagram of an example system that may be used to view and interact with fraud prevention system 408, according to an example implementation of the disclosed technology. The components and arrangements shown in FIG. 4 are not intended to limit the disclosed embodiments as the components used to implement the disclosed processes and features may vary. As shown, fraud prevention system 408 may interact with a user device 402 via a network 406. In certain example implementations, the fraud prevention system 408 may include a local network 412, a trust score generation system 320, a web server 410, and a database 416.

In some embodiments, a respective user may operate the user device 402. The user device 402 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 406 and ultimately communicating with one or more components of the fraud prevention system 408. In some embodiments, the user device 402 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the fraud prevention system 408. According to some embodiments, the user device 402 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The trust score generation system 320 may include programs (scripts, functions, algorithms) to configure data for visualizations and provide visualizations of datasets and data models on the user device 402. This may include programs to generate graphs and display graphs. The trust score generation system 320 may include programs to generate histograms, scatter plots, time series, or the like on the user device 402. The trust score generation system 320 may also be configured to display properties of data models and data model training results including, for example, architecture, loss functions, cross entropy, activation function values, embedding layer structure and/or outputs, convolution results, node outputs, or the like on the user device 402.

The network 406 may be of any suitable type, including individual connections via the internet such as cellular or WiFi networks. In some embodiments, the network 406 may connect terminals, services, and mobile devices using direct connections such as RFID, NFC, Bluetooth™, BLE, WiFi™, ZigBee™, ABC protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network (VPN) using a public network, and/or other suitable connection(s) that enable(s) components in the system 400 environment to send and receive information between the components of the system 400. The network 406 may also include a PSTN and/or a wireless network.

The fraud prevention system 408 may be associated with and optionally controlled by one or more entities such as a business, corporation, individual, partnership, or any other entity that provides one or more of goods, services, and consultations to individuals such as customers. In some embodiments, the fraud prevention system 408 may be controlled by a third party on behalf of another business, corporation, individual, partnership. The fraud prevention system 408 may include one or more servers and computer systems for performing one or more functions associated with products and/or services that the organization provides.

Web server 410 may include a computer system configured to generate and provide one or more websites accessible to customers, as well as any other individuals involved in accessing fraud prevention system 408's normal operations. Web server 410 may include a computer system configured to receive communications from user device 402 via for example, a mobile application, a chat program, an instant messaging program, a voice-to-text program, an SMS message, email, or any other type or format of written or electronic communication. Web server 410 may have one or more processors 422 and one or more web server databases 424, which may be any suitable repository of website data. Information stored in web server 410 may be accessed (e.g., retrieved, updated, and added to) via local network 412 and/or network 406 by one or more devices or systems of system 400. In some embodiments, web server 410 may host websites or applications that may be accessed by the user device 402. For example, web server 410 may host a financial service provider website that a user device may access by providing an attempted login that are authenticated by the trust score generation system 320. According to some embodiments, web server 410 may include software tools, similar to those described with respect to user device 402 above, that may allow web server 410 to obtain network identification data from user device 402. The web server may also be hosted by an online provider of website hosting, networking, cloud, or backup services, such as Microsoft Azure™ or Amazon Web Services™.

The local network 412 may include any type of computer networking arrangement used to exchange data in a localized area, such as WiFi, Bluetooth™, Ethernet, and other suitable network connections that enable components of the fraud prevention system 408 to interact with one another and to connect to the network 406 for interacting with components in the system 400 environment. In some embodiments, the local network 412 may include an interface for communicating with or linking to the network 406. In other embodiments, certain components of the fraud prevention system 408 may communicate via the network 406, without a separate local network 406.

The fraud prevention system 408 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 402 may be able to access fraud prevention system 408 using the cloud computing environment. User device 402 may be able to access fraud prevention system 408 using specialized software. The cloud computing environment may eliminate the need to install specialized software on user device 402.

In accordance with certain example implementations of the disclosed technology, the fraud prevention system 408 may include one or more computer systems configured to compile data from a plurality of sources the trust score generation system 320, web server 410, and/or the database 416. The trust score generation system 320 may correlate compiled data, analyze the compiled data, arrange the compiled data, generate derived data based on the compiled data, and store the compiled and derived data in a database such as the database 416. According to some embodiments, the database 416 may be a database associated with an organization and/or a related entity that stores a variety of information relating to customers, transactions, ATM, and business operations. The database 416 may also serve as a back-up storage device and may contain data and information that is also stored on, for example, database 360, as discussed with reference to FIG. 3.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets. Foreign keys may be unique (e.g., a personal identifier) or shared (e.g., a postal code). Datasets of the embodiments may be "clustered," for example, a group of datasets may share common features, such as overlapping data, shared statistical properties, or the like. Clustered datasets may share hierarchical relationships (e.g., data lineage).

Example Use Case

The following example use case describes an example of a typical user flow pattern. This section is intended solely for explanatory purposes and not in limitation.

In one example, Sally may be a customer of a financial institution and may periodically provide the institution with a variety of account, personal, and financial information. The financial institution may maintain this information, for example, in one or more of Sally's accounts. Sally may monitor her accounts and conduct transactions within an online account or profile she has established with the financial institution. Once Sally logs into her account, for example, by entering her username and password, Sally may be able to navigate through various tabs and pages in order to conduct different transactions. Sally may decide that she would like to virtually view her credit card, including the card number, expiration date, and Card Verification Value (CVV) code. This feature may be beneficial to Sally when she is online shopping, as it may prevent her from always having to track down her physical card.

Within her account, Sally may initiate or request the system allow her to virtually view her credit card. As this type of transaction may introduce potential risk of fraud to the financial institution, for example, by potentially enabling someone other than Sally to view Sally's credit card information, the financial institution may utilize an MLM to determine whether the current user (potentially, Sally) and Sally's device (e.g., a mobile device) are a trusted user-device pair. The MLM may be configured to make such determination by evaluating Sally's account, personal, and financial information on file with the financial institution, and/or equivalent information corresponding to other customers of the financial institution. The MLM may further evaluate various engagement features associated with Sally and Sally's mobile device, such as how often Sally logs into her account using this mobile device, how often Sally has historically been challenged (e.g., asked to input authentication information), how often Sally has initiated a transaction yet abandoned the process pre-completion, how long has passed since Sally conducted a transaction or activity within her account, etc. Based on evaluating this information and data, the MLM may be configured to determine a trust score associated with Sally and her mobile device. The system may then determine whether the trust score exceeds a predetermined threshold, indicating an overall fraud recall rate for the financial institution may increase above an acceptable predefined rate. Should the trust score be found to exceed the predetermined threshold, the system may transmit a notification to Sally's mobile device, or another device known to be associated with Sally, requesting Sally conduct multi-factor authentication (e.g., input biometric information). Once the system receives Sally's multi-factor authentication input, and determines it matches Sally's authentication information stored on file with the financial institution, Sally may be able to complete her requested transaction, i.e., virtually view her credit card. Alternatively, should the system find that the trust score does not exceed the predetermined threshold, Sally may be permitted to simply complete her requested transaction without having to input any additional information to the system.

In some examples, disclosed systems or methods may involve one or more of the following clauses:

Clause 1: A system comprising: one or more processors; and a memory in communication with the one or more processors and storing instructions that, when executed by the one or more processors, are configured to cause the system to: receive data corresponding to a plurality of users; receive, via a plurality of user devices associated with the plurality of users, a respective request to conduct a plurality of transactions; generate, via a machine learning model (MLM) and based on the data, trust scores associated with the plurality of users and the plurality of user devices, wherein each trust score indicates a probability that a user device, of the plurality of user devices, is associated with a user of the plurality of users; determine whether each trust score of a plurality of trust scores exceeds a predetermined threshold; and responsive to determining a trust score of the plurality of trust scores exceeds the predetermined threshold, conduct one or more fraud prevention actions with respect to a corresponding user device and user, wherein a rate of conducting the one or more fraud prevention actions for the plurality of users is 30 percent or less.

Clause 2: The system of clause 1, wherein the one or more fraud prevention actions comprise transmitting a notification to the corresponding user device, requesting the corresponding user conduct multi-factor authentication, or both.

Clause 3: The system of clause 1, wherein generating the trust scores is further based on one or more respective features associated with the plurality of users and the plurality of user devices.

Clause 4: The system of clause 3, wherein the one or more respective features comprise one or more of login frequency, challenge rate, abandonment rate, success rate, time since a previous activity, number of recent devices associated with a user, number of users associated with a user device, user device age, user device type, or combinations thereof.

Clause 5: The system of clause 4, wherein the challenge rate comprises a respective rate of conducting the one or more fraud prevention actions for each of the plurality of users.

Clause 6: The system of clause 4, wherein: the abandonment rate comprises a first respective rate associated with each of the plurality of users abandoning a respective request to conduct one or more transactions; and the success rate comprises a second respective rate associated with each of the plurality of users successfully completing one or more requested actions associated with the one or more fraud prevention actions.

Clause 7: A system comprising: one or more processors; and a memory in communication with the one or more processors and storing instructions that, when executed by the one or more processors, are configured to cause the system to: receive data corresponding to a user; receive, via a user device, a request for authentication; determine that the request does not satisfy one or more static rules; responsive to determining the request does not satisfy the one or more static rules, generate, via a machine learning model (MLM) and based on the data, a trust score associated with the user and the user device, wherein the trust score indicates a probability that the user device is associated with the user; determine whether the trust score exceeds a predetermined threshold; and responsive to determining the trust score exceeds the predetermined threshold, conduct one or more fraud prevention actions.

Clause 8: The system of clause 7, wherein a rate of conducting the one or more fraud prevention actions for a plurality of users is 30 percent or less, and wherein the plurality of users comprises the user.

Clause 9: The system of clause 7, wherein the one or more fraud prevention actions comprise transmitting a notification to the user device, requesting the user conduct multi-factor authentication, or both.

Clause 10: The system of clause 7, wherein generating the trust score is further based on one or more features associated with the user and the user device.

Clause 11: The system of clause 10, wherein the one or more features comprise one or more of login frequency, challenge rate, abandonment rate, success rate, time since a previous activity, number of recent devices associated with the user, number of users associated with the user device, user device age, user device type, or combinations thereof.

Clause 12: The system of clause 11, wherein the challenge rate comprises a rate of conducting the one or more fraud prevention actions for the user.

Clause 13: The system of clause 11, wherein: the abandonment rate comprises a first rate associated with the user abandoning the request to conduct the transaction; and the success rate comprises a second rate associated with the user successfully completing one or more requested actions associated with the one or more fraud prevention actions.

Clause 14: A method comprising: receiving data corresponding to a user; receiving, via a user device, a request to conduct a transaction; generating, via a machine learning model (MLM) and based on the data, a trust score associated with the user and the user device, wherein the trust score indicates a probability that the user device is associated with the user; determining whether the trust score exceeds a predetermined threshold; and responsive to determining the trust score exceeds the predetermined threshold, conducting one or more fraud prevention actions.

Clause 15: The method of clause 14, wherein a rate of conducting the one or more fraud prevention actions for a plurality of users is 30 percent or less, and wherein the plurality of users comprises the user.

Clause 16: The method of clause 14, wherein the one or more fraud prevention actions comprise transmitting a notification to the user device, requesting the user conduct multi-factor authentication, or both.

Clause 17: The method of clause 14, wherein generating the trust score is further based on one or more features associated with the user and the user device.

Clause 18: The method of clause 17, wherein the one or more features comprise one or more of login frequency, challenge rate, abandonment rate, success rate, time since a previous activity, number of recent devices associated with the user, number of users associated with the user device, user device age, user device type, or combinations thereof.

Clause 19: The method of clause 18, wherein the challenge rate comprises a rate of conducting the one or more fraud prevention actions for the user.

Clause 20: The method of clause 18, wherein: the abandonment rate comprises a first rate associated with the user abandoning the request to conduct the transaction; and the success rate comprises a second rate associated with the user successfully completing one or more requested actions associated with the one or more fraud prevention actions.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   one or more processors; and
   a memory in communication with the one or more processors and storing instructions that, when executed by the one or more processors, are configured to cause the system to:
   receive data corresponding to a plurality of users;
   receive, via a plurality of user devices associated with the plurality of users, a respective request to conduct a plurality of transactions;
   determine whether the respective request satisfies one or more static rules;
   responsive to determining the respective request does not satisfy the one or more static rules, determine whether a machine learning model (MLM) should be utilized to conduct a customized authentication process for the respective request;
   responsive to determining the MLM should be utilized:
   generate, via the MLM and based on the data, trust scores associated with the plurality of users and the plurality of user devices, wherein each trust score indicates a probability that a user device, of the plurality of user devices, is associated with a user of the plurality of users;
   determine an overall fraud tolerance associated with the plurality of transactions, the overall fraud tolerance comprising a percentage;
   determine a predetermined threshold based on the overall fraud tolerance;
   determine whether each trust score of a plurality of trust scores exceeds the predetermined threshold thereby causing the overall fraud tolerance to exceed the percentage; and
   responsive to determining a trust score of the plurality of trust scores exceeds the predetermined threshold, conduct one or more customized fraud prevention actions with respect to a corresponding user device and user,
   wherein a rate of conducting the one or more customized fraud prevention actions for the plurality of users is 30 percent or less.

2. The system of claim 1, wherein the one or more customized fraud prevention actions comprise transmitting a notification to the corresponding user device, requesting the corresponding user conduct multi-factor authentication, or both.

3. The system of claim 1, wherein generating the trust scores is further based on one or more respective features associated with the plurality of users and the plurality of user devices.

4. The system of claim 3, wherein the one or more respective features comprise one or more of login frequency, challenge rate, abandonment rate, success rate, time since a previous activity, number of recent devices associated with a user, number of users associated with a user device, user device age, user device type, or combinations thereof.

5. The system of claim 4, wherein the challenge rate comprises a respective rate of conducting the one or more customized fraud prevention actions for each of the plurality of users.

6. The system of claim 4, wherein:
   the abandonment rate comprises a first respective rate associated with each of the plurality of users abandoning a respective request to conduct one or more transactions; and
   the success rate comprises a second respective rate associated with each of the plurality of users successfully completing one or more requested actions associated with the one or more customized fraud prevention actions.

7. The system of claim 1, wherein the rate of conducting the one or more customized fraud prevention actions for the plurality of users is greater than 30 percent when the trust scores are not generated.

8. A non-transitory-computer-readable medium storing instructions that, when executed by a computer, cause it to:
   receive data corresponding to a plurality of users;
   receive, via a plurality of user devices associated with the plurality of users, a respective request to conduct a plurality of transactions;
   determine whether the respective request satisfies one or more static rules;
   responsive to determining the respective request does not satisfy the one or more static rules, determine whether a machine learning model (MLM) should be utilized to conduct a customized authentication process for the respective request;
   responsive to determining the MLM should be utilized:

generate, via the MLM and based on the data, trust scores associated with the plurality of users and the plurality of user devices, wherein each trust score indicates a probability that a user device, of the plurality of user devices, is associated with a user of the plurality of users;

determine an overall fraud tolerance associated with the plurality of transactions, wherein the overall fraud tolerance comprises a percentage;

determine a predetermined threshold based on the overall fraud tolerance;

determine whether each trust score of a plurality of trust scores exceeds the predetermined threshold thereby causing the overall fraud tolerance to exceed the percentage; and responsive to determining a trust score of the plurality of trust scores exceeds the predetermined threshold, conduct one or more customized fraud prevention actions with respect to a corresponding user device and user, wherein a rate of conducting the one or more customized fraud prevention actions for the plurality of users is 30 percent or less.

9. The non-transitory-computer-readable medium of claim 8, wherein the one or more customized fraud prevention actions comprise transmitting a notification to the corresponding user device, requesting the corresponding user conduct multi-factor authentication, or both.

10. The non-transitory-computer-readable medium of claim 8, wherein generating the trust scores is further based on one or more features associated with the plurality of users and the plurality of user devices.

11. The non-transitory-computer-readable medium of claim 10, wherein the one or more features comprise one or more of login frequency, challenge rate, abandonment rate, success rate, time since a previous activity, number of recent devices associated with a user, number of users associated with a user device, user device age, user device type, or combinations thereof.

12. The non-transitory-computer-readable medium of claim 11, wherein the challenge rate comprises a rate of conducting the one or more customized fraud prevention actions for each of the plurality of users.

13. The non-transitory-computer-readable medium of claim 11, wherein: the abandonment rate comprises a first rate associated with each of the plurality of users abandoning a respective request to conduct one or more transactions; and the success rate comprises a second rate associated with each of the plurality of users successfully completing one or more requested actions associated with the one or more customized fraud prevention actions.

14. A method comprising:

receiving data corresponding to a plurality of users;

receiving, via a plurality of user devices associated with the plurality of users, a respective request to conduct a plurality of transactions;

determining whether the respective request satisfies one or more static rules;

responsive to determining the respective request does not satisfy the one or more static rules, determining whether a machine learning model (MLM) should be utilized to conduct a customized authentication process for the respective request;

responsive to determining the MLM should be utilized:
generating, via the MLM and based on the data, trust scores associated with the plurality of users and the plurality of user devices, wherein each trust score indicates a probability that a user device, of the plurality of user devices, is associated with a user of the plurality of users;

determining an overall fraud tolerance associated with the plurality of transactions, wherein the overall fraud tolerance comprises a percentage;

determining a predetermined threshold based on the overall fraud tolerance;

determining whether each trust score of a plurality of trust scores exceeds the predetermined threshold thereby causing the overall fraud tolerance to exceed the percentage; and responsive to determining a trust score of the plurality of trust scores exceeds the predetermined threshold, conducting one or more customized fraud prevention actions with respect to a corresponding user device and user, wherein a rate of conducting the one or more customized fraud prevention actions for the plurality of users is 30 percent or less.

15. The method of claim 14, wherein the one or more customized fraud prevention actions comprise transmitting a notification to the corresponding user device, requesting the corresponding user conduct multi-factor authentication, or both.

16. The method of claim 14, wherein generating the trust scores is further based on one or more features associated with the plurality of users and the plurality of user devices.

17. The method of claim 16, wherein the one or more features comprise one or more of login frequency, challenge rate, abandonment rate, success rate, time since a previous activity, number of recent devices associated with a user, number of users associated with a user device, user device age, user device type, or combinations thereof.

18. The method of claim 17, wherein:

the abandonment rate comprises a first rate associated with each of the plurality of users abandoning a respective request to conduct one or more transactions; and the success rate comprises a second rate associated with each of the plurality of users successfully completing one or more requested actions associated with the one or more customized fraud prevention actions.

* * * * *